Oct. 3, 1933.  G. W. MATTSON  1,928,731
TABLE FOR AUTOMOBILES AND THE LIKE
Filed June 23, 1932
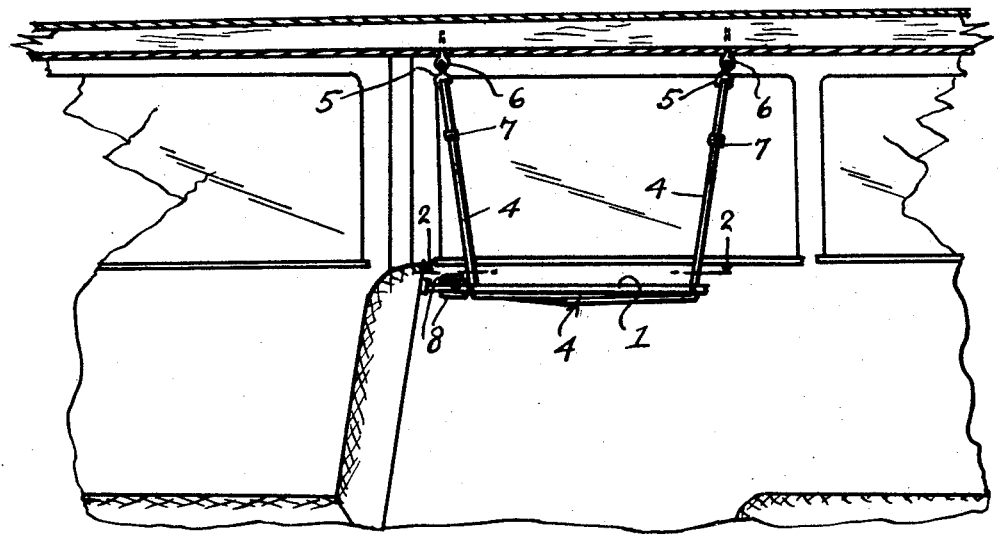
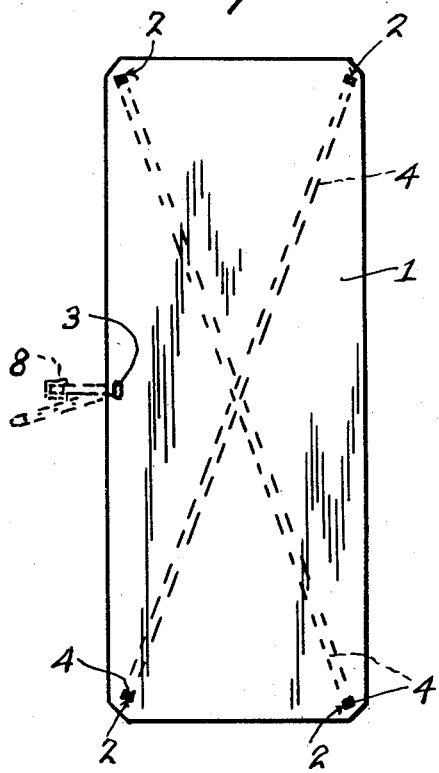
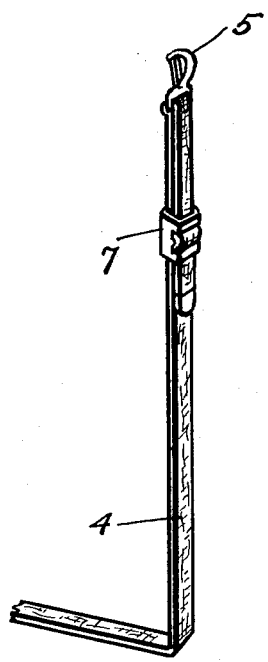
Inventor
George W. Mattson
By *Clarence A. O'Brien*
Attorney Patented Oct. 3, 1933

1,928,731

UNITED STATES PATENT OFFICE 1,928,731

TABLE FOR AUTOMOBILES AND THE LIKE

George W. Mattson, Denver, Colo.

Application June 23, 1932. Serial No. 618,949

4 Claims. (Cl. 45—51)

This invention relates to a table for automobiles and the like, the general object of the invention being to provide a table which may be suspended in level position from the top of the automobile irrespective of the position which the body of the automobile may take.

The invention also contemplates certain other features of construction, and the combination and arrangement of the several parts as hereinafter more fully described and illustrated in the accompanying drawing and specifically pointed out in the appended claims.

In describing the invention in detail, reference will be had to the accompanying drawing, wherein like characters denote like or corresponding parts throughout the several views, and in which:—

Fig. 1 is a fragmentary longitudinal sectional view through the body of an automobile showing the device of the invention applied thereto.

Fig. 2 is a section on line 2—2 of Fig. 1.

Fig. 3 is a perspective view of portions of one of the suspension straps.

The table forming member or board 1, which may be formed of any suitable material, has an opening 2 at each corner thereof and it may also have an opening 3 at the center of one of its edges. A pair of flexible members such as the straps 4 are arranged to pass diagonally, in opposite directions, under the board, and these straps are threaded through the corner openings 2, as shown in Fig. 2, and then pass upwardly to be connected by snap hooks or other appropriate suspension members 5 with the eye bolts 6 or the like, carried by the ceiling of the automobile body.

The straps are preferably looped through openings in the snap hooks 5 and then have their ends passed downwardly through buckles 7. Thus the length of the straps may be so adjusted as to arrange the table member or board 1 at the desired height. A short strap 8 which is passed through the opening 3 may be connected with a robe rail or the front seat back as shown in Fig. 1.

By placing the two straps in a diagonal position underneath the table member or board 1, a resultant of two forces, namely the forces acting at right angles to one another, one running parallel to the sides of the member 1 and the other parallel to its ends, is obtained. This makes it possible to vary the position of the table with ease by simply shifting the position of the board or member 1 with respect to the straps 4 as permitted by the arrangement of the straps through the openings 2.

Thus it will be seen that I have provided simple means for supporting a table in automobiles or other vehicles, whereby the table may be adjusted as desired to suit the occupants, and whereby the table forming member or board may be placed in level or other desired position, despite the position of the body of the vehicle.

Due to its construction the table can be placed under a seat or in any available small space when not in use, and no nails, screws or sharp edges exist to tear clothing and upholstery. Moreover, there are no legs to interfere with the comfort of the occupants of the vehicle. The parts are easily replaced when necessary, and the table can be used for various purposes, as is obvious.

While the drawing shows the invention as applied to a table member or board, it may be used to suspend a cradle or swing in a car.

It is thought from the foregoing description that the advantages and novel features of the invention will be readily apparent.

It is to be understood that changes may be made in the construction and in the combination and arrangement of the several parts within the spirit of the invention and the scope of the appended claims.

Having thus described my invention, what I claim as new is:—

1. A device of the class described, comprising a member having openings adjacent to its corners, a pair of diagonally arranged straps passing under the member with their ends passing through said openings, suspension members at the ends of the straps, means for attaching said suspension members to a supporting member, and means for attaching one of the edges of the first-mentioned member to a supporting member.

2. Means for suspending a board from the ceiling of an automobile or the like, comprising a board having openings adjacent to its corners, a pair of straps having portions passing diagonally under the board with their ends passing upwardly through said openings, suspension members adjustably connected with the ends of the straps, members attached to the ceiling of the automobile for engaging the suspension members, and a strap connected with the front edge of the board for engaging the back of the front seat of the automobile.

3. In a device of the class described, a table member or board provided with four openings symmetrically spaced with respect to its edges, a pair of similar flexible members applied to said board and extending diagonally in crossed arrangement upon its under side, the four ends of said flexible members passed upwardly through said four openings respectively and diverging upwardly therefrom, and each end provided with a suspension member, and a relatively fixed support provided with four supporting members to which the said suspension members are severally connected to furnish a four-point suspension for said table member or board, said table member or board slidable with respect to said flexible members to adjust it to desired angular position with respect to said relatively fixed support.

4. In a device of the class described, a table member or board provided with four openings symmetrically spaced with respect to its edges, a pair of similar flexible members applied to said board and extending diagonally in crossed arrangement upon its under side, the four ends of said flexible members passed upwardly through said four openings respectively and each end provided with a suspension member to which it is adjustably connected, and a relatively fixed support provided with four supporting members to which the said suspension members are severally connected to furnish a four-point suspension for said table member or board, said table member or board slidable with respect to said flexible members to adjust it to desired angular position with respect to said relatively fixed support and each of said flexible members separately adjustable with respect to its said suspension member to vary the height of said table member or board.

GEORGE W. MATTSON.